(12) United States Patent
Kroun et al.

(10) Patent No.: US 6,584,560 B1
(45) Date of Patent: Jun. 24, 2003

(54) METHOD AND SYSTEM FOR BOOTING A MULTIPROCESSOR COMPUTER

(75) Inventors: Jack Kroun, Austin, TX (US); Kevin Lee Miller, Austin, TX (US); Armando Jaime Martinez, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/552,608

(22) Filed: Apr. 19, 2000

(51) Int. Cl.$^7$ .............................................. G06F 15/177
(52) U.S. Cl. .................................. 713/2; 713/1
(58) Field of Search ........................ 713/2, 1

(56) References Cited

U.S. PATENT DOCUMENTS

| | | | |
|---|---|---|---|
| 5,276,832 A | | 1/1994 | Holman, Jr. ................ 395/425 |
| 5,448,716 A | | 9/1995 | Hardell, Jr. et al. ......... 395/550 |
| 5,642,506 A | | 6/1997 | Lee ............................. 395/650 |
| 5,655,149 A | * | 8/1997 | Muegge et al. ............... 710/10 |
| 5,790,850 A | * | 8/1998 | Natu ............................. 713/2 |
| 5,848,367 A | | 12/1998 | Lotocky et al. .............. 701/36 |
| 5,860,002 A | * | 1/1999 | Huang ........................... 713/2 |
| 5,867,702 A | | 2/1999 | Lee ............................. 395/651 |
| 5,904,733 A | * | 5/1999 | Jayakumar .................... 713/2 |
| 6,009,521 A | * | 12/1999 | Huang ........................... 713/2 |
| 6,058,475 A | * | 5/2000 | McDonald et al. ............ 713/2 |
| 6,108,781 A | * | 8/2000 | Jayakumar .................... 713/2 |

FOREIGN PATENT DOCUMENTS

| | | | |
|---|---|---|---|
| JP | 6103250 A | 4/1994 | ............ G06F/15/16 |
| JP | 08272756 A | * 10/1996 | ......... G06F/15/177 |

OTHER PUBLICATIONS

Embedded Pentium® Processor Family Developer's Manual, Chapter 17 entitled "Microprocessor Initializaton and Configuration", pp. 17–225–17–254.
*Multiprocessor Specification*, Ver. 1.4, (May 1997).

* cited by examiner

*Primary Examiner*—Dennis M. Butler
*Assistant Examiner*—Eric Chang
(74) *Attorney, Agent, or Firm*—Baker Botts L.L.P.

(57) ABSTRACT

A method and system for choosing the control processor for booting a multiprocessor system (10) in accordance with a memory (42). A computer system (10) includes a plurality of computer processors (12). The processors (12) use a memory bus (18) to communicate with the main memory (20). A second bus (30) connects the processors (12) to an interupt controller (34). The second bus (30) includes multiple bus request lines (14). An initialization control circuit (32) also communicates with the second bus (30). Memory (42) in the initialization control circuit (32) holds data identifying at least one of the processors (12) and when power is first provided to the system, the initialization control circuit (32) operates to assert signals on the bus request lines (14) such that the identified processor initializes the computer system.

13 Claims, 2 Drawing Sheets

METHOD AND SYSTEM FOR BOOTING A MULTIPROCESSOR COMPUTER

TECHNICAL FIELD OF THE DISCLOSURE

The present disclosure relates in general to computer systems having multiple processors and methods of using the same, and, more particularly, to a method and system for booting a multiprocessor computer.

BACKGROUND OF THE DISCLOSURE

Some tasks performed by computer systems can be broken down into components that can be performed simultaneously. A computer system that includes more than one central processing unit or CPU can achieve greater efficiency by assigning each component of such a task to a different processor so that they can be performed in parallel. Such a computer system is often referred to as a multiprocessor computer system. A multiprocessor computer system has the flexibility to employ a single processor when the task can not be efficiently divided and multiple processors when it can.

Multiprocessor computer systems must be developed in accordance with an architecture that addresses the requirements of several simultaneous processors. Elements of single processor computer system architectures such as use of memory and communication with peripheral devices must be modified so that conflicts do not occur between processors. For example, two processors might both attempt to change a value in memory at the same time. From a hardware standpoint, two processors may be undertaking entirely different tasks such that they would not attempt to change the same memory location. Even then both processors might attempt to use the memory bus at the same time to reach two separate memory locations. Multiple processor computer systems must juggle both logical and physical conflicts brought about by parallel execution of tasks.

Both single processor and multiprocessor computer systems include initialization sequences to attain a specified state from a cold or warm boot. For example, a computer that was disconnected from power during a move would experience a cold boot when it was reconnected to electrical power. A warm boot would occur if the same computer was running normally and the user executed a reboot command. A well known reboot command is the use of CTRL-ALT-DEL on computers using the DOS operating system. Computer system designers can utilize different initialization sequences depending upon whether the system has experienced a cold boot or a warm boot.

Computer systems are programmed to undertake initialization sequences for many reasons. Testing the hardware components is conveniently undertaken prior to use of those components. If a hardware component is not responding as it should, a testing routine will be better able to cope and respond than a routine that is not written with the possibility of hardware failure in mind. Initialization also rebuilds data in volatile memory. Many computer systems employ volatile memory for the bulk of their memory requirements. Such memory does not retain data in the absence of power. For example, capacitors may hold charge that indicates a value in memory. A disruption of power causes the charge to be lost and the previously stored value cannot thereafter be determined. Data about hardware configurations and data stored by an operating system to perform such functions as file management and access must be placed in volatile memory. A particular initialization sequence may be designed to address only one of the previous concerns or may address a different concern entirely.

Initialization sequences in multiprocessor computer systems often address hardware testing and configuration of data in volatile memory in a manner similar to single processor systems. Multiprocessor systems, however, often have other additional issues to address. For example, if the initialization sequence has not been divided into components that can be performed by several processors, the system must determine which processor will initialize the computer. That processor is often called the bootstrap processor or BSP. The initialization of a multiprocessor system may also include forming data for handling conflicts between processors for hardware and logical resources. If the processors are not identical, criteria may be used to choose the processor that will run the initialization sequence. Applying the criteria, however, requires the use of a processor. Some conventional systems, therefore, choose a bootstrap processor, apply the criteria, determine that another processor is better, and reassign the bootstrap processor status. The first processor to be designated as bootstrap processor is often determined by wiring. In other words, one of the processor sockets or slots is wired so that the processor that is in that socket or slot begins the initialization sequence.

The redesignation of the bootstrap processor during the initialization sequence can cause problems. Once a computer system has been assembled, the same processors stay in the same sockets. The initialization sequence can be slowed down if the socket wired to contain the bootstrap processor does not contain the best processor as determined by the criteria. In that case, a processor switch must occur every time initialization occurs. Additionally, program routines designed to facilitate the communications of the processors with the peripherals through interrupts are often configured with respect to the current bootstrap processor. A change in bootstrap processor can cause those system management interrupt routines to become stuck in a loop that hangs the system. Reinstallation of the system management interrupt routines may also take significant time.

An additionally disadvantage of the hardwired bootstrap processor is vulnerability to hardware failure. If the processor that is in the hardwired socket fails, the system may be unable to boot even though the other processors are working. Hardware checks that require a particular processor to begin initialization also cannot be performed unless that processor happens to be located in the hardwired socket.

SUMMARY OF THE DISCLOSURE

A method and system for booting a multiprocessor computer are disclosed that provide one or more significant advantages. None of the advantages, by itself, is critical or necessary to the disclosure.

A computer system is provided that can boot a multiprocessor system without reference to a hardwired precedence among the processors. The computer system includes a plurality of computer processors. A memory bus allows the processors to communicate with a main memory. A second bus connects the processors to an interrupt controller. The second bus includes at least bus request lines. An initialization control circuit that can read and assert signals on the bus request lines is provided. The initialization control circuit includes a memory having data identifying one of the processors. In one specific embodiment, the memory is nonvolatile so that it retains data without power. In another embodiment the memory is volatile and is programmed by the chipset prior to selection of the bootstrap processor. The initialization control circuits directs the system to employ the processor identified in the memory as the chief initialization processor.

A more specific computer system is also provided in which each processor includes a local interrupt controller. The local interrupt controllers are connected to the bus request lines.

A method is provided for booting a multiprocessor computer in which power is provided to an initialization control circuit and the processors of a multiprocessor system. A location in the memory of the initialization control circuit is read to identify one of the processors. Values are asserted by the initialization control circuit on one or more bus request lines connected to the processors. The asserted values correspond to the identified processor. A signal is generated and communicated to the processors. In response to the signal the processors sample the bus request lines. The system is then booted under the control of the processor identified in the memory of the initialization control circuit. A further enhancement of the method groups the processors into clusters and specifies the identified processor in a specified cluster.

It is a technical advantage of the disclosed methods and systems that each processor can control the initialization process from the beginning, allowing diagnostic routines to be run.

Another technical advantage of the system and method disclosed is that the identity of a processor that is chosen according to specified criteria during a first initialization sequence can be stored and used to control subsequent initialization sequences from the beginning. Fewer changes in processor control during the initialization sequence can reduce the duration of the average initialization sequence and avoid possible system failures. Not all embodiments achieve each advantage and no one advantage is critical or required. Other technical advantages of the present disclosure will be readily apparent to one skilled in the art from the following figures, descriptions, and claims.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE DISCLOSURE

Figure 1:
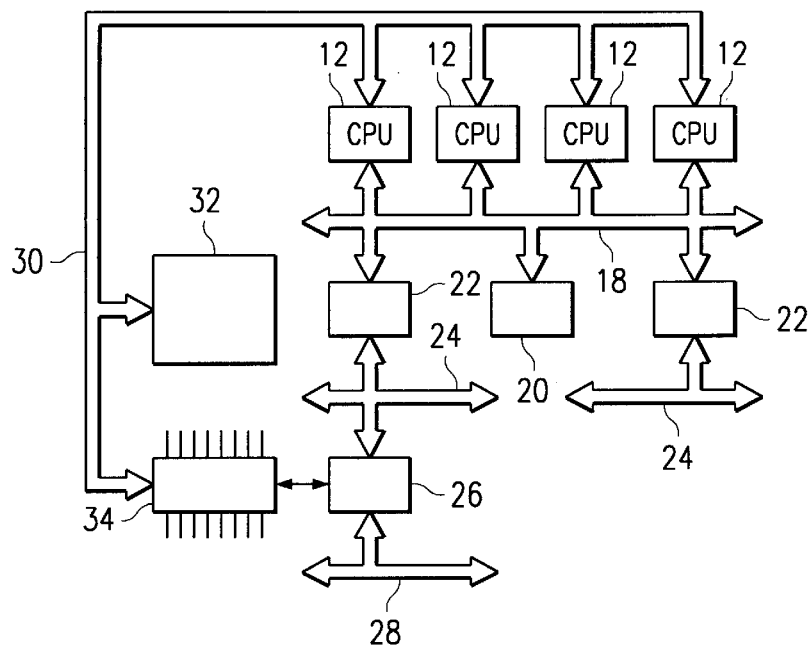
FIG. 1 is a diagram of a multiprocessor computer system in an embodiment of the present disclosure.

FIG. 1 is a diagram of a multiprocessor computer system in an embodiment of the present disclosure. The computer system 10 includes multiple processors 12. In another embodiment the computer system 10 could include multiple clusters with each cluster including multiple processors 12. The processors 12 communicate with a bus 18 that is referred to as the processor bus in this embodiment. The processor bus 18 is connected to a main memory 20 and one or more bus bridges 22. The bus bridges 22 allow communication between the processor bus 18 and the PCI bus 24. A second bus bridge 26 allows communication between the PCI bus 24 and an E/ISA bus 28. Alternate embodiments could employ different buses or circuits for communications between components. Other components of the computer system such as a video card, monitor, printer, keyboard, or mouse are connected to a bus or bridge in order to communicate with the processors and memory.

The processors also communicate with a second bus, the APIC bus 30. Each of the buses has several lines. For example, a bus might include 16, 32, or 64 lines such that several values may be communicated in a single bus cycle. The APIC bus 30 includes a plurality of bus request lines 14 (shown in FIG. 2). An initialization control circuit 32 is connected to at least the bus request lines of the APIC bus 30. The initialization control circuit can be a programmable logic device (PLD), a programmable logic array (PLA), or programmable array logic (PAL). The APIC bus 30 is also connected to an IO APIC module 34 that is connected to the second bus bridge 26. During operation the computer system 10 receives interrupt requests from peripheral devices through the IO APIC Module 34. The processors 12 receive the interrupts from the APIC bus 30. More specifically, the processors 12 receive interrupt packets from the APIC bus 30. Those packets are cracked by the local APICs 40 (see FIG. 3).

Figure 2:
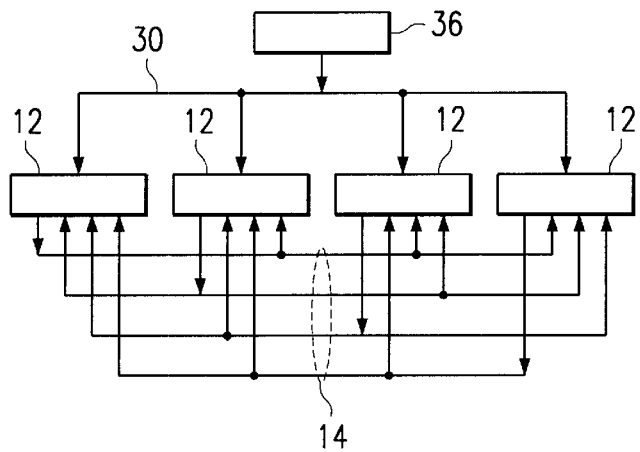
FIG. 2 is a diagram of bus connections between processors in an embodiment of the present disclosure.

FIG. 2 is a diagram of bus connections between processors in an embodiment of the present disclosure. In this embodiment, the four processors 12 each have pins connected to four bus request lines 14. The connections are made such that a single asserted value on a bus request line 14 will be received at a different pin of each of the processors 12. An additional line 30 can be used by a priority agent 36 to require one of the processors 12 to assert its first bus request line 14 pin. The processors 12 sample their bus request lines 14 in response to a predetermined signal. For example, the processors 12 may sample their bus request lines 14 when a reset signal is deasserted. The processors 12 respond to values on the bus request lines 14. Only one of the processors 12 will act as the bootstrap processor depending upon the state of its bus request pins at the time of the predetermined signal.

Figure 3:
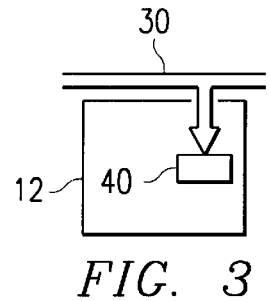
FIG. 3 is a diagram of bus connections internal to a processor in an embodiment of the present disclosure.

FIG. 3 is a diagram of bus connections internal to a processor in an embodiment of the present disclosure. Each processor 12 can include an internal local APIC 40. The local APIC 40 communicates with the rest of the processor 12 and the APIC bus 30. In an alternative embodiment, the processors 12 do not have internal local APICs 40 and a local APIC 40 is externally provided for each processor between the processor 12 and the APIC bus 30. In either case, the local APICs 40 control interrupt status and response for the processors 12.

Figure 4:
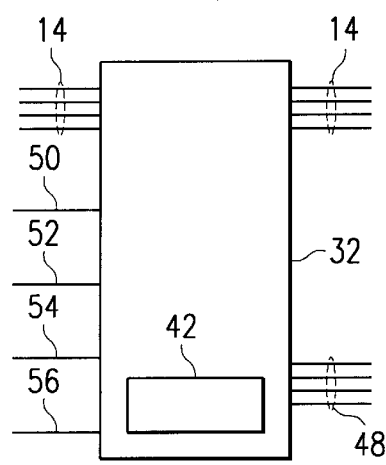
FIG. 4 is an initialization control circuit used in the present disclosure.

FIG. 4 is a diagram of the initialization control circuit 32 used in the present disclosure. The inputs of are shown on the left side of the circuit 32 and the outputs are shown on the right side. The data lines 48, however, can both receive and transmit data. In some embodiments, the same pins and connections are used for both inputs and outputs on, for example, the bus request lines 14. The initialization control circuit 32 is able to both sample and assert values upon the bus request lines 14 of the APIC bus 30. The initialization control circuit 32 also has inputs for receiving data 48, a write signal 50, a clear signal 52, a power good signal 54, and a select signal 56. Alternative embodiments may include fewer or more connections. The signals from other than the bus request lines 14 can be received from one of the bus bridges 22,26. The initialization control circuit also has nonvolatile random access memory 42. In an alternative embodiment, the circuit can include a ROM or a volatile memory or any other storage device.

The clear pin 52 and write pin 50 along with the data inputs 48 can be used to program the memory 42 with the procedure for asserting values on the bus request lines 14 during initialization. For example, a diagnostic program can require that the multiprocessor computer boots with each processor as the bootstrap processor (BSP). The initialization control circuit 32 can be programmed to assert signals on the bus request lines 14 that are sampled by the processors 12 upon receipt of a separate signal. The first program would identify the first processor to be tested. Each reboot would then reprogram the initialization control circuit 32 to assert different values on the bus request lines 14 so that a different processor 12 would act as the bootstrap processor. In this way a diagnostic sequence could test each of the processors 12. If a processor 12 failed to initialize the system, the initialization control circuit 32 could be reprogrammed to try a different processor 12 without switching the physical sockets of the processors 12. In an alternative embodiment, the data 48 and write 50 connections could be detachably coupled to an external diagnostic device so that the circuit 32 could be programmed without using just the bus bridges 22, 26.

Figure 5:
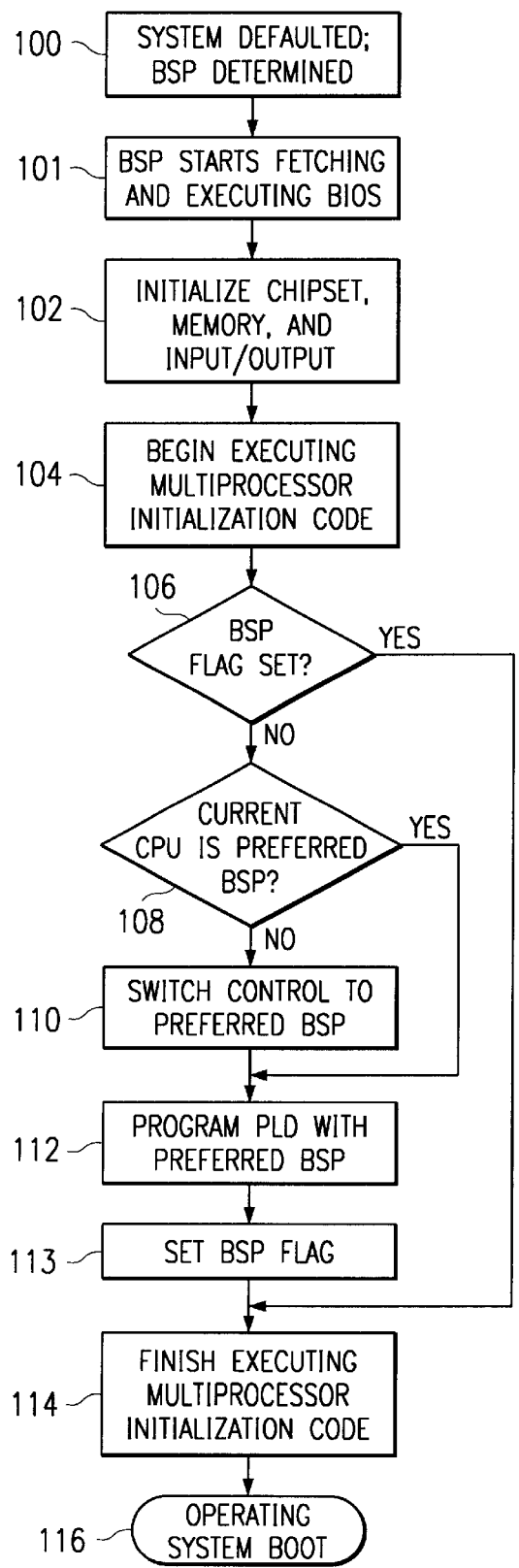
FIG. 5 is a flow diagram of a method for booting a computer system of the present disclosure.

FIG. 5 is a flow diagram of a method for booting a computer system of the present disclosure. When a cold or warm boot occurs, a bootstrap processor (BSP) is chosen 100 in accordance with the programming of the initialization control circuit 32. If the initialization control circuit 32 is unprogrammed, the hardwiring of the motherboard determines the bootstrap processor (BSP). The bootstrap processor fetches and executes the BIOS 101. BIOS stands for Basic Input Output System. The bootstrap processor proceeds to initialize the chipset, including the bus bridges 22, 26, the memory, and input/output devices 102. The bootstrap processor then begins to execute multiprocessor initialization code 104. The bootstrap processor checks to see if a BSP flag is set 106. If the flag is not set, the bootstrap processor assembles information on each of the processors 12 in the multiprocessor computer system 10. The current bootstrap processor chooses the preferred bootstrap processor by applying predetermined criteria to the assembled information and checks to see if the current BSP is the preferred BSP 108. For example, the predetermined criteria may require that the processor with the least features act as the bootstrap processor (BSP). If the current BSP is not the preferred BSP, control is shifted to the preferred BSP 110. Whether or not a shift in control occurs, the initialization control circuit 32 is programmed to choose the preferred BSP during the next boot 112. The BSP flag is then set 113. The BSP then finishes the multiprocessor code 114 and initializes the computer operating system 116. Once the initializaton control circuit 32 is programmed and the BSP flag is set, subsequent boots will be run with the preferred BSP as the initial BSP and will skip the preferred BSP analysis. Subsequent boot sequences will not require, therefore, the extra time for switching BSP during the boot.

Although the present disclosure has been described in detail, it should be understood that various changes, substitutions and alterations can be made thereto without departing from the spirit and scope of the invention as defined by the appended claims.

What is claimed is:

1. A computer system, comprising:
   a plurality of computer processors;
   a first bus coupled to the computer processors and to at least one main memory;
   a second bus coupled to the computer processors and an interrupt controller, and having a plurality of bus request lines;
   a chipset coupled to the computer processors; and
   an initialization control circuit coupled to the bus request lines and having a volatile memory, the volatile memory programmed by the chipset with data identifying at least one of the plurality of computer processors, the initialization control circuit operable to assert signals on the bus request lines such that the at least one computer processor identified in the memory initializes the computer system.

2. The computer system of claim 1, further comprising:
   a plurality of local interrupt controllers, each coupled to at least one of the computer processors and to the second bus.

3. The computer system of claim 1, wherein each of the plurality of computer processors includes a local interrupt controller coupled to the second bus.

4. The computer system of claim 1, wherein the identified processor is the processor with the most limited feature set.

5. The computer system of claim 1, wherein the initialization control circuit includes data inputs and a write input for updating the memory.

6. The computer system of claim 1, wherein the identified processor is the current processor in a diagnostic sequence.

7. The computer system of claim 1, wherein the initialization control circuit is a programmable logic device.

8. A method for initializing a computer system, comprising the steps of:
   providing power to a plurality of processors, a chipset and an initialization control circuit;
   determining a bootstrap processor using the chipset;
   programming a volatile memory of the initialization control circuit with data representing the bootstrap processor;
   reading the bootstrap processor from the volatile memory of the initialization control circuit;
   asserting a value on at least one bus request line connected to the processors, the value or values asserted corresponding to the bootstrap processor;
   providing a first signal to the plurality of processors;
   sampling the bus request lines in each processor in response to receiving the first signal; and
   booting the system under the control of the bootstrap processor.

9. The method for initializing a computer system of claim 8, further comprising the steps of:
   grouping the processors into a plurality of clusters; and
   choosing a cluster; and wherein the bootstrap processor is in the chosen cluster.

10. The method for initializing a computer system of claim 9, wherein each cluster includes an equal number of processors.

11. A method for programming an initialization control circuit, comprising the steps of:
   providing power to a plurality of processors and an initialization control circuit;
   determining an initial bootstrap processor by the hardware wiring of the processors to a bus;

detecting the presence of the remaining processors;

initializing the remaining processors;

building a multi processor table containing information including the family and model of the processors;

selecting a processor with the most limited features based on the information contained in the multi processor table; and transferring data identifying the selected processor to a memory of an initialization control circuit.

12. The method for programming an initialization control circuit of claim 11, further comprising the steps of:

initializing the selected processor if the selected processor is not the initial bootstrap processor; and transferring control to the selected processor if the selected processor is not the initial bootstrap processor.

13. The method for programming an initialization control circuit of claim 11, wherein the step of determining an initial bootstrap processor by the hardware wiring of the processors to a bus comprises:

asserting a first signal received by a first processor seated in a particular socket or slot;

designating the first processor as the initial bootstrap processor;

asserting a second signal on an output of the initial bootstrap processor;

receiving the second signal at bus request inputs of the remaining processors; and designating the remaining processors as application processors.

* * * * *